United States Patent
Landaas et al.

(10) Patent No.: US 8,634,690 B2
(45) Date of Patent: Jan. 21, 2014

(54) SUBSEA PENETRATOR AND METHOD FOR PRODUCING SUCH

(75) Inventors: Viggo Landaas, Kongsberg (NO); Trond Holger Villmark, Kongsberg (NO)

(73) Assignee: Siemens Aktiengesellschaft, Munich (DE)

( * ) Notice: Subject to any disclaimer, the term of this patent is extended or adjusted under 35 U.S.C. 154(b) by 51 days.

(21) Appl. No.: 12/668,203

(22) PCT Filed: Jul. 8, 2008

(86) PCT No.: PCT/NO2008/000261
§ 371 (c)(1),
(2), (4) Date: Jan. 8, 2010

(87) PCT Pub. No.: WO2009/008738
PCT Pub. Date: Jan. 15, 2009

(65) Prior Publication Data
US 2011/0002592 A1    Jan. 6, 2011

(30) Foreign Application Priority Data
Jul. 11, 2007   (NO) .................................. 20073580

(51) Int. Cl.
*G02B 6/00* (2006.01)
*G02B 6/36* (2006.01)
*B23P 19/00* (2006.01)

(52) U.S. Cl.
USPC .............................. 385/138; 29/428; 439/204

(58) Field of Classification Search
USPC .......................... 385/123, 137, 138, 139, 147
See application file for complete search history.

(56) References Cited

U.S. PATENT DOCUMENTS

| | | | |
|---|---|---|---|
| 4,029,894 A | 6/1977 | Jarvis et al. | 174/70 S |
| 4,181,175 A | 1/1980 | Mcgee et al. | 166/88.4 |
| 4,469,399 A * | 9/1984 | Cowen et al. | 385/138 |
| 4,682,846 A * | 7/1987 | Cowen | 385/138 |
| 4,759,601 A | 7/1988 | Knutsen et al. | 385/61 |
| 4,891,640 A | 1/1990 | Ip | 340/854.7 |
| 5,091,987 A * | 2/1992 | MacCulloch et al. | 385/66 |
| 5,151,967 A * | 9/1992 | Ebinuma | 385/138 |
| 5,155,795 A * | 10/1992 | Wasserman et al. | 385/138 |
| 5,588,086 A * | 12/1996 | Fan | 385/138 |
| 6,445,867 B1 | 9/2002 | Gilliland et al. | |
| 6,796,821 B2 | 9/2004 | Cairns et al. | 439/204 |
| 2006/0210231 A1 | 9/2006 | Wittrisch | |

FOREIGN PATENT DOCUMENTS

EP    0105198    4/1984
JP    56060404    5/1981

* cited by examiner

*Primary Examiner* — Akm Enayet Ullah
(74) *Attorney, Agent, or Firm* — King & Spalding L.L.P.

(57) ABSTRACT

The present invention relates to a subsea fibre-optic penetrator comprising a plurality of through-going optical fibres (1) and a metallic main body (3) with at least one through bore (31). According to the invention the optical fibres (1) are affixed in the main body (3) by cast glass material (2). The invention also relates to a method for providing a subsea penetrator with a plurality of through-going fibres.

7 Claims, 1 Drawing Sheet

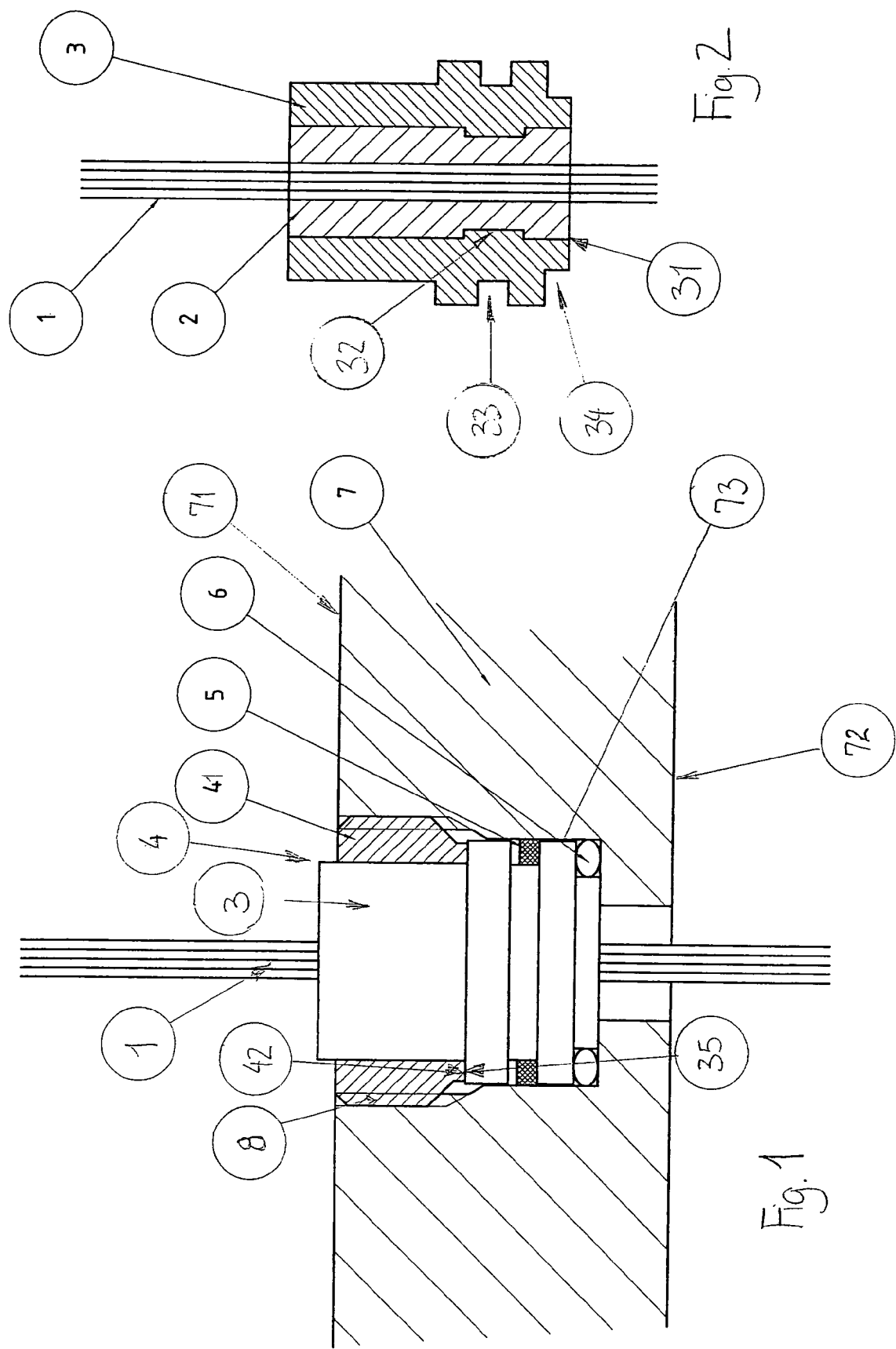

SUBSEA PENETRATOR AND METHOD FOR PRODUCING SUCH

FIELD OF THE INVENTION

The present invention relates to a subsea fibre-optic penetrator comprising a plurality of through-going optical fibres in a metallic main body with at least one through bore and a method for providing a subsea penetrator.

BACKGROUND OF THE INVENTION

There are several types of subsea fibre-optic penetrators. One possible method of forming a fibre-optic penetrator is by encapsulating the fibre in an external tube, typically a metal tube, by means of a potting compound, typically an epoxy compound, which bonds so well to both fibre and tube that it makes a watertight connection. The fibre-optic penetrator is then provided with external sealing elements on the outside of the external tube and inserted into a cylindrical hole in the wall which has to be penetrated by the penetrator. The sealing elements in turn provide a seal between the walls of the hole and the surface of the tube, thereby achieving a total seal of the wall feed-through. Alternatively, the penetrator may consist in the fibre being directly encapsulated in a cylindrical potting compound without the use of an external tube, or in a further alternative the fibre, which in this case must be surrounded by a plastic sheath of a certain thickness, forms a seal directly against the penetrator wall with rubber sealing, typically an O-ring. Glass-cast fibre-optic penetrators are found for land-based equipment.

During use subsea penetrators are subjected to substantial stresses and have completely different operating conditions from, for example, a corresponding penetrator onshore. A subsea penetrator must provide a good seal even with great variations in both pressure and temperature.

SUMMARY OF THE INVENTION

An object of the present invention is to provide a subsea penetrator which offers protection against fluid infiltration. It is also an object to provide a subsea penetrator which can withstand the temperatures and pressure existing in connection with subsea utilisation, thus enabling the penetrator to be employed at great depths and at considerably higher temperatures than the limits for the range of use for known subsea fibre penetrators. It is also an object to provide a subsea fibre penetrator which occupies less space and offers more security against leakage.

These objects are achieved with a subsea fibre-optic penetrator according to the following independent claims where further features will be apparent from the dependent claims.

According to the invention a subsea fibre-optic penetrator is provided comprising a plurality of through-going optical fibres in a metallic main body with at least one through bore. In this penetrator the optical fibres are affixed to the main body by cast glass material. The metallic main body may be made of different types of metal. One or more bores may be provided in the main body, and if there is only one bore, this may be arranged centrally in the main body, but alternatively also eccentrically. If there is a plurality of bores, these may be arranged symmetrically about a centre of the main body, or, for example, they may be in groups. According to the invention a plurality of optical fibres is directly affixed to the main body by cast glass material in one of the through bores. Several through-going fibres are therefore arranged in the same through bore. In a variant there may be several fibres in each bore and in a variant one bore may have one fibre, but other bores may have a plurality of fibres. With a solution of this kind where several through-going fibres are directly affixed in a through bore by means of a cast glass material, a penetrator is provided which safeguards against fluid infiltration in connection with the fibre feed-through and which can withstand high pressure and temperatures. Furthermore, by having several fibres extending through the same hole, a penetrator is achieved which requires relatively little space, which is particularly advantageous subsea. One example may be an insertion in a container with 1 atmosphere internal pressure and 600-700 bar pressure externally and where an increase in the diameter of the opening for locating the penetrator gives a relatively greater amount of stress in the attachment point which is to begin with a critical part of the container with regard to stress. Due to the fact that a plurality of fibres are directly casted in the through bore, the manufacturing process is also not so demanding with regard to time as individual encapsulation of fibres in each through bore.

According to an aspect the main body may comprise an outer profile adapted to provide a seal against a penetrator feed-through. This outer profile may comprise at least one portion adapted for placing sealing elements, and/or at least one portion adapted for metal-metal sealing with an inner wall of the penetrator feed-through. The outer profile may also be adapted for locking together with the penetrator feed-through, for example with a threaded portion, or snap-in locking devices. In a cross section taken across the feed-through of the optical fibres, the outer profile may be circular, oval, rectangular or of other shapes.

According to an aspect of the invention the glass material in the cast between the fibres and the main body and the metal material in the main body has compatible coefficients of expansion. Compatible coefficient of expansion should be understood to mean that the coefficient of expansion have a value which correspond to or are close to each other. By adapting the coefficients of expansion in this manner, a joining is obtained which maintains relatively equal stress ratios between glass material and metal material for most temperatures.

According to an aspect of the invention at least a portion of the bore in the main body will be filled with the glass material for attachment of the optical fibre, or the optical fibres in the main body. In another variant the whole bore is filled with glass material for attachment of the fibres.

With a penetrator according to the invention, a penetrator is obtained which is substantially proof against fluid infiltration, it can withstand high temperatures and pressure and can therefore be employed at great depths and at substantially higher temperatures than known subsea fibre-optic penetrators. With a penetrator according to the invention many fibres may also be fed through the same penetrator, thereby reducing the risk of leakages, since there is only one seal between the penetrator and a penetrator feed-through instead of a seal between each penetrator for each fibre, and a penetrator feed-through, i.e. the number of penetrators can be reduced.

The invention also relates to a method for providing a subsea fibre-optic penetrator, comprising the steps of providing a metallic main body with at least one through bore, and securing a plurality of optical fibres directly to the main body by a glass material in a through bore.

The invention will now be explained by non-limiting embodiments with reference to the drawings in which;

FIG. 1 illustrates a penetrator arranged in a penetrator feed-through and

FIG. 2 shows a cross section of a penetrator according to the invention.

The solid cast fibre-optic penetrator, as illustrated in FIG. 2, is produced by enclosing the optical fibre 1 in a main body 3 by means of glass potting compound 2 so as to obtain a strong, watertight connection between fibre 1, potting compound 2 and main body 3.

The main body 3 must have a shape which is suited for external sealing of the penetrator by means of metallic sealing elements 5 or a direct metal-metal seal with the outside of the main body 3 and/or any secondary sealing elements 6 between the main body 3 and the penetrator feed-through 73 in the wall 7 of the penetrator housing in order to handle special operating conditions or requirements. The penetrator feed-through 73 leads from an outside 71 of the wall 7 to an inside 72, in such a way that the fibres 1 run through the wall 7. In the illustrated example the penetrator 4 comprises a main body 3 with an internal bore 31 through which the fibres run. The internal bore 31 comprises an internal flange portion 32 which projects into the potting compound 2. The main body 3 also comprises a first external portion 33 and a second external portion 34 adapted for cooperation with a sealing element 5, 6 for providing a seal against the penetrator feed-through 73. Alternatively, the portions 33, 34 may be designed so as to form a metal-metal seal against the wall of the penetrator feed-through 73. A metal-metal seal will stop hydrocarbons from reaching the fibres in the penetrator, thereby providing better and more reliable protection against high pressure and temperature. As shown in the figure, the penetrator 4 may further comprise an attachment portion 41, which portion may comprise outer threads for cooperation with internal threads in the penetrator feed-through for securing the penetrator. This attachment portion 41 may be arranged movably in relation to the main body 3, but comprise an abutment surface 42 for abutment against a flange surface 35 of the main body 3 for securing thereof in the penetrator feed-through in the wall 7. The attachment portion 41 may also be a separate part. The fibres 1 extending through the main body 3 may be continuous or discontinuous and the joint implemented through the main body 3. The penetrator feed-through 73 through the wall 7 has a shape which is complementary to an outer shape of the penetrator 4. As mentioned above, the actual penetrator 4 may comprise several separate parts or be produced in one piece.

The area of application for a penetrator according to the invention is typically high pressure at great ocean depths and/or high temperatures which are common downhole in oil wells, where it has not hitherto been possible to use fibre-optic penetrators. A potting compound must be chosen which is sufficiently strong and watertight to withstand the stresses to which it is subjected, and it must be compatible with the environment in which is it located, and these requirements are met by the penetrator according to the invention. The main body must be manufactured with regards to a material and design that satisfy the operating requirements. The combination of glass sealing against the fibre, a main body adapted for fibre with glass sealing and metal sealing between the main body and penetrator housing/wall will withstand all known stresses to which a fibre-optic subsea penetrator is subjected.

The invention is suited for use in connection with distribution of optical signals in subsea installations, particularly in the oil industry. Such installations are dependent on reliable signal distribution in order to control and operate the installations. This applies typically to remotely controlled oil wells etc. where a signal has to be transmitted over long distances and in some cases to great depths, up to 3000 m at the present time. Such areas of application require equipment with maximum functional reliability. Other related areas of application are also possible.

The invention claimed is:

1. A subsea fibre-optic penetrator configured for arrangement in a penetrator feed-through formed in a wall of a penetrator housing, the subsea fibre-optic penetrator comprising:
    a plurality of through-going optical fibres in a metallic main body member with at least one through bore,
    wherein a plurality of optical fibres are directly affixed in the main body member by an integral body of cast glass material in one of the through bores, such that the plurality of optical fibres are encased by the integral body of cast glass material,
    wherein the main body member comprises a portion of an outer profile adapted for metal-metal sealing against an inner surface of a first axial portion of the penetrator feed-through, and
    an attachment portion that rotates relative to the main body member of the penetrator, wherein the attachment portion is configured for insertion into a second axial portion of the penetrator feed-through, and wherein a radially exterior surface of the attachment portion is configured to interact with a radially interior surface of the second axial portion of the penetrator feed-through to secure the main body member in the first axial portion of the penetrator feed-through and the attachment portion in the second axial portion of the penetrator feed-through.

2. A subsea penetrator according to claim 1, wherein the main body member comprises an outer profile adapted for providing a seal against a penetrator feed-through.

3. A subsea penetrator according to claim 1, wherein the cast glass material and the metallic material of the main body member have compatible coefficient of expansion.

4. A subsea penetrator according to claim 1, wherein at least a portion of the bore is casted with the glass material.

5. A subsea penetrator according to claim 1, wherein an inner surface of the through bore defines an internal flange configured to resist movement of the integral body of cast glass material in an axial direction.

6. A subsea penetrator according to claim 1, wherein the radially exterior surface of the attachment portion forms a threaded connection with the radially interior surface of the second axial portion of the penetrator feed-through.

7. A method for manufacturing a subsea fibre-optic penetrator, comprising:
    providing a metallic main body member with at least one through bore, the main body member including a portion of an outer profile adapted for metal-metal sealing against an inner surface of a first axial portion of a penetrator feed-through, and
    directly affixing a plurality of optical fibres in the main body by an integral body of glass material in a through bore, wherein the directly affixing includes encasing the plurality of optical fibres by the integral body of cast glass material,
    providing an attachment portion that rotates relative to the main body member of the penetrator, wherein the attachment portion is configured for insertion into a second axial portion of the penetrator feed-through, and wherein a radially exterior surface of the attachment portion is configured to interact with a radially interior surface of the second axial portion of the penetrator feed-through to secure the main body member in the first axial portion of the penetrator feed-through and the attachment portion in the second axial portion of the penetrator feed-through.

* * * * *